(12) United States Patent
Sakai et al.

(10) Patent No.: US 7,576,888 B2
(45) Date of Patent: Aug. 18, 2009

(54) COLOR REDUCTION PROCESSING APPARATUS AND COLOR REDUCTION METHOD

(75) Inventors: Atsushi Sakai, Sakaki-machi (JP); Teruyuki Takata, Ueda (JP); Tomohiro Kodama, Matsumo (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 10/900,687

(22) Filed: Jul. 28, 2004

(65) Prior Publication Data

US 2005/0062989 A1 Mar. 24, 2005

(30) Foreign Application Priority Data

Jul. 30, 2003 (JP) ............................. 2003-203851

(51) Int. Cl.
*G06K 1/00* (2006.01)
*H04N 1/46* (2006.01)

(52) U.S. Cl. ................. 358/1.9; 358/3.06; 358/3.13; 358/515; 358/521; 358/534; 358/535; 358/536

(58) Field of Classification Search ................ 358/1.9, 358/3.06, 3.13–3.2, 515–521, 534–536
See application file for complete search history.

(56) References Cited

U.S. PATENT DOCUMENTS

| 3,752,072 | A | * | 8/1973 | Lorber ........................ 101/211 |
| 4,554,241 | A | | 11/1985 | Edwards |
| 4,903,048 | A | | 2/1990 | Harrington |
| 5,070,413 | A | * | 12/1991 | Sullivan et al. ............. 358/3.03 |
| 5,233,684 | A | * | 8/1993 | Ulichney ..................... 345/604 |
| 5,581,359 | A | * | 12/1996 | Kaburagi et al. ............ 358/518 |
| 5,633,734 | A | * | 5/1997 | Lathrop et al. .............. 358/530 |
| 5,673,116 | A | * | 9/1997 | Fukushima ................. 358/3.08 |
| 5,680,230 | A | * | 10/1997 | Kaburagi et al. ............ 358/520 |
| 5,719,689 | A | * | 2/1998 | Terada ........................ 358/529 |
| 5,748,785 | A | * | 5/1998 | Mantell et al. .............. 382/237 |
| 5,777,750 | A | * | 7/1998 | Takiyama et al. ........... 382/162 |
| 5,815,286 | A | * | 9/1998 | Matsuba et al. ............. 358/3.19 |
| 5,845,056 | A | * | 12/1998 | Kohler et al. ................ 358/1.9 |
| 5,949,964 | A | * | 9/1999 | Clouthier et al. ........... 358/3.06 |
| 5,988,504 | A | * | 11/1999 | Smitt ......................... 382/237 |
| 6,100,999 | A | * | 8/2000 | Ikegami ..................... 358/1.9 |
| 6,185,013 | B1 | * | 2/2001 | Harrington et al. .......... 358/520 |
| 6,206,504 | B1 | | 3/2001 | Payne |
| 6,501,567 | B2 | * | 12/2002 | Sharma et al. .............. 358/3.19 |

(Continued)

FOREIGN PATENT DOCUMENTS

JP 09200554 7/1997

(Continued)

*Primary Examiner*—King Y Poon
*Assistant Examiner*—Richard Z Zhu (57) ABSTRACT

A color reduction processing apparatus and method that is simple to configure and adjust produces two-color print image data reflecting the impression of the original full-color image. Each pixel in a full-color image is converted to binarized principal and secondary color print data by principal and secondary color processors respectively using respective threshold value matrices. The threshold values of these matrices, which are calculated from a reference threshold value matrix stored in memory, can be adjusted, via adjustment values, to control the overall density of the principal and secondary colors. The adjustment values can be set in a matrix configuration unit. The binarized principal and secondary color print data can also be further corrected by correction and/or filtering operations performed by a correction processor.

23 Claims, 7 Drawing Sheets

U.S. PATENT DOCUMENTS

| | | | |
|---|---|---|---|
| 6,559,975 B1 * | 5/2003 | Tolmer et al. | 358/1.9 |
| 6,839,150 B1 * | 1/2005 | Sugiura et al. | 358/1.9 |
| 6,844,941 B1 * | 1/2005 | Sharma et al. | 358/1.9 |
| 7,085,006 B2 * | 8/2006 | Yokoyama et al. | 358/1.9 |
| 7,330,286 B2 * | 2/2008 | Fukasawa | 358/1.9 |
| 2002/0089514 A1 | 7/2002 | Kitahara et al. | |
| 2002/0089686 A1 | 7/2002 | Kitahara et al. | |
| 2002/0097436 A1 | 7/2002 | Yokoyama et al. | |
| 2003/0002060 A1 * | 1/2003 | Yokoyama et al. | 358/1.9 |
| 2004/0051887 A1 * | 3/2004 | Nishide et al. | 358/1.9 |

FOREIGN PATENT DOCUMENTS

| | | |
|---|---|---|
| JP | 2002-269550 | 9/2002 |
| JP | 2002-288682 | 10/2002 |
| JP | 2002-314833 | 10/2002 |
| WO | 0163909 A1 | 8/2001 |

* cited by examiner

COLOR REDUCTION PROCESSING APPARATUS AND COLOR REDUCTION METHOD

BACKGROUND OF THE INVENTION

1. Field of the Invention

The present invention relates to a color reduction processing apparatus and color reduction method that converts image data containing multiple colors, including full-color image data, to image data containing fewer colors.

2. Description of the Related Art

Each pixel in a 24-bit depth full-color RGB image contains color data typically expressed as a combination of three primary colors (e.g., red (R), green (G), and blue (B)), each of which is defined by one of a possible 256 levels. To print this color data using a limited number of colors requires color reduction. Common basic color reduction methods include error diffusion, dithering, and halftoning. Achieving print results that are as close as possible to the original full-color image using just these methods is, however, difficult. One conventional method of solving this problem is to first reduce the full-color image to an 8-color image by dithering, and then further reduce this 8-color image to two or three colors using the luminance values of the 8-color image data to achieve print results that are closer to the original full-color image. See, for example, Japanese Unexamined Patent Appl. Pubs. 2002-269550, 2002-288682, and 2002-314833.

The foregoing prior art enables the processing of print data based on luminance values, for example, and thus enables such image processing effects as emphasizing contours and generating distinctive images emphasizing specific parts of the original image data. The problem is that the printed output (i.e., the printed image) can differ greatly from the original full-color image. A further problem is that the operation and process required for color reduction processing are complicated.

OBJECTS OF THE INVENTION

The present invention is therefore directed to solving these problems, and an object of this invention is to provide a color reduction processing apparatus and color reduction method that is simple to configure and produces two-color print image data that is closer to the original full-color image.

A further object of the invention is to provide a color reduction processing apparatus and color reduction processing method that can easily change the density of individual print colors in print data that is reduced to two-colors.

SUMMARY OF THE INVENTION

To achieve the foregoing objects, the present invention uses different threshold value matrices to reduce full-color image data to binary principal and secondary color print data. The threshold values of these principal color and secondary color threshold value matrices can be changed to adjust the color density in the resulting print image. The principal color and secondary color print data may also be filtered to generate non-printing data for certain pixels according to a specified pattern regardless of the thresholding results. The print data may also be corrected based on a specified reference value. The overall brightness of the image and the balance between the principal color and secondary color in the print image can thus be adjusted to produce two-color print image data that more closely represents the original full-color image.

According to one aspect, the invention involves a color reduction processing device that converts full-color image data to principal color print data of which black or another specified low-brightness color is the principal color, and to secondary color print data of which any one of the three color components (e.g., R, G and B) of the full-color image data is the secondary color. A matrix storage unit stores a reference threshold value matrix. A matrix configuration unit sets a first adjustment value that is mathematically applied to (e.g., added to or subtracted from) each threshold value of the reference threshold value matrix to generate a first threshold value matrix, and sets a second adjustment value that is mathematically applied to (e.g., added to or subtracted from) each threshold value of the reference threshold value matrix to generate a second threshold value matrix. A principal color data processing unit multiplies the values of the color components (e.g., R, G, B components) of each pixel in the full-color image data by respective coefficients and adds the resulting products for each pixel to produce a weighted value for each pixel, and compares a matrix of all the weighted pixel values with the first threshold value matrix to generate binarized principal color print data. A secondary color data processing unit compares the second threshold value matrix with matrices containing color values for the two color components in the full-color image data not designated as the secondary color respectively to generate binarized secondary color print data.

The principal color print data can thus be generated according to the brightness of the component (e.g., RGB) color data constituting the full-color image data, and the secondary color print data can be generated based on the color data for the two colors not designated as the secondary color. The full-color image can thus be reduced to two-color print data that closely represents the original full-color image.

Furthermore, because separate threshold values can be set for the principal color and secondary color in the color reduction process, the principal color and secondary color can be emphasized or de-emphasized as desired to produce a two-color print image that is close to the original full-color image.

Preferably, the principal color data processing unit and secondary color processing unit generate the binarized principal and secondary color print data respectively (i.e., perform color reduction) by dithering using the first threshold value matrix and second threshold value matrix respectively. Dithering is one method of binarizing full-color image data.

Yet further preferably, the principal color data processing unit calculates the weighted pixel value for each pixel in the full-color image data using the equation:

weighted pixel value=$R*0.299+G*0.578+B*0.144$.

Yet further preferably, if any one of the R, G, and B color data values for a given pixel in the full-color image data is greater than or equal to the corresponding threshold value in the first threshold value matrix, a first correction process unit corrects the principal color print data to non-printing data for that pixel, even if the weighted pixel value is less than or equal to the corresponding threshold value in the first threshold value matrix and the principal color print data is set to print.

Thus, with this logic, when any of the RGB luminance values is greater than the corresponding threshold value in the first threshold value matrix (that is, if the pixel is brighter than the threshold value), that print dot (pixel) is not printed in the dark principal color. The overall image is thus prevented from becoming dark.

Yet further preferably, a second correction process unit corrects secondary print color data to non-printing data for any pixel irrespective of the binary output of the secondary color data processing unit for that pixel, if the value of the color component designated as the secondary color for that pixel in the full-color image data is less than the corresponding threshold value in the second threshold value matrix.

That is, when the secondary color designated color component for a pixel in the full-color image data is less than a specific threshold value, the secondary color print data for that pixel is set to non-printing regardless of the binary output of the secondary color data processing unit. As a result, secondary color dots (pixels) where the color data is less than this threshold value will not print with the secondary color.

Yet further preferably, a third correction process unit corrects secondary color print data to non-printing for any pixel, if the principal color data processing unit and secondary color data processing unit both set the print data for that pixel or dot position to print. The principal color printing area is thus clearly defined, and the contours of the printed image are emphasized.

Yet further preferably, a filter processing unit applies to a binarized print data matrix one or both of: a filtering process that sets principal color print data in a first set of alternating columns in the print data matrix to non-printing and sets secondary color print data in a second set of alternating columns in the print data matrix to non-printing, or a filtering process that alternately sets principal color print data and secondary color print data to non-printing in raster scan sequence.

The color reduction processing device may be embodied in a printer driver or printer control apparatus.

In another aspect, the invention involves a color reduction method for converting full-color image data containing pixels, each defined by a combination of three color components (e.g., R, G and B), to principal color print data of which black or another specified low-brightness color is the principal color, and to secondary color print data of which any one of the three color components is the secondary color, the method comprising the steps of: (a) acquiring full-color image data; (b) generating a first threshold value matrix and second threshold value matrix by mathematically applying to (e.g., adding to or subtracting from) the threshold values of a reference threshold value matrix a first adjustment value and second adjustment value respectively; (c) multiplying the values of the color components of each pixel in the full-color image data by a respective coefficients and adding the resulting products for each pixel to produce a weighted value for each pixel, and comparing a matrix containing all of the weighted pixel values with the first threshold value matrix to generate the principal color print data in the form of binary data; and (d) comparing the second threshold value matrix with matrices containing color values for the two color components in the full-color image data not designated as the secondary color respectively to generate the secondary color print data in the form of binary data.

Preferably, the binarized principal and secondary color print data generated in steps (c) and (d) respectively is generated by dithering that is performed using the first threshold value matrix and second threshold value matrix respectively.

Preferably, in step (c), the weighted pixel value for each pixel in the full-color image data using the equation: weighted pixel value=R*0.299+G*0.578+B*0.144.

The method may further comprise the step of correcting principal color print data to non-printing data for any pixel irrespective of the binary output value for that pixel in step (c), if the value of any one of the color components for that pixel in the full-color image data is greater than or equal to the corresponding threshold value in the first threshold value matrix.

The method may further comprise the step of correcting secondary color print data to non-printing data for any pixel irrespective of the binary output value for that pixel in step (d), if the value of the color component designated as the secondary color for that pixel in the full-color image data is less than the corresponding threshold value in the second threshold value matrix.

In one embodiment, the secondary color print data is corrected to non-printing for any pixel, if, in steps (c) and (d), both the principal and secondary color print data for that pixel is set to print.

The color reduction method may further comprise the step of applying to a binarized print data matrix one or both of: a filtering process that sets principal color print data in a first set of alternating columns in the print data matrix to non-printing and sets secondary color print data in a second set of alternating columns in the print data matrix to non-printing, or a filtering process that alternately sets principal color print data and secondary color print data to non-printing in raster scan sequence.

The above-described color reduction method or any steps thereof may be implemented by a program of instructions executed on a computer or other instruction-readable device. The program may be embodied on a device-readable medium.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
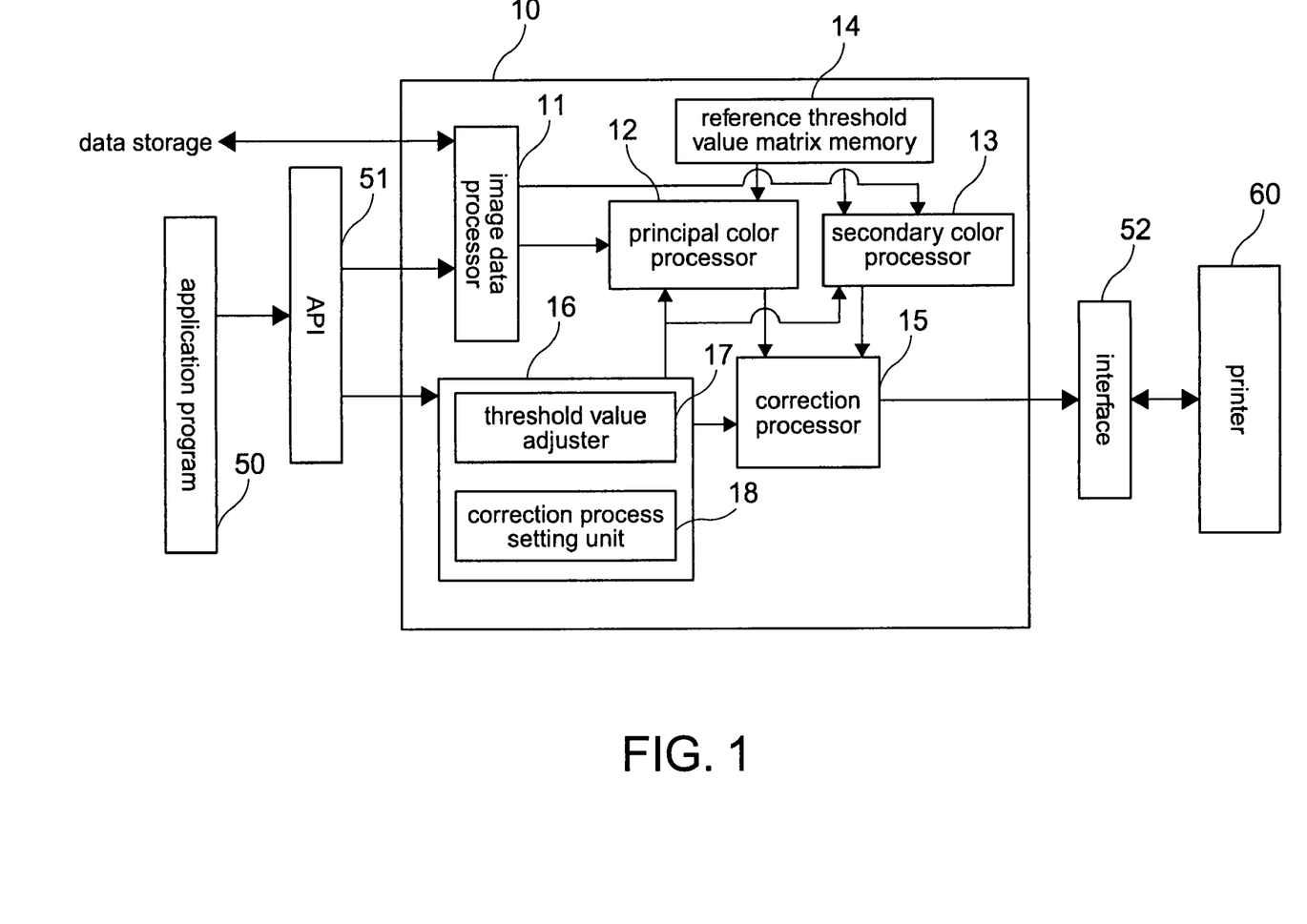
FIG. 1 is a functional block diagram of a color reduction processing apparatus according to an embodiment of the present invention.

Preferred embodiments of the present invention are described below with reference to the accompanying figures, of which FIG. 1 is a functional block diagram of a color reduction processor and related components. This color reduction processor 10 can be embodied in the printer driver of a personal computer. A full-color image data process request is input to the color reduction processor 10 from an application program 50 through an application program interface (API) 51. An image data processor 11 of the color reduction processor 10 reads the image file specified by the process request directly from a disk or other data storage medium connected directly or via a network to the system, and thus acquires the full-color image data. The image data processor 11 then deconstructs (i.e., divides) the acquired full-color image data into pixel units.

In full-color image data each pixel has a value (from among 256 gradation levels (0 to 255)) for each of the primary colors (e.g., red (R), green (G), and blue (B)). However, the printer may be able to print using only a limited number of colors, and thus cannot produce all of the gradation levels possible in a full-color image. Therefore, to produce a print image that closely captures the impression of the original full-color image using a limited range of colors (print colors), the full-color image data is converted in the color reduction process to binary data appropriate to the full-color image data.

To reduce full-color image data to two-color image data, the color reduction processor 10 shown in FIG. 1 separates the original image data into principal and secondary colors, and then applies separate color reduction processes to the principal color and secondary color. The principal color is preferably black or another color with a comparably low brightness level (that is, a relatively dark color). For ease of description, this embodiment of the invention is described using black as the principal color. To produce a print image that is as close as possible to the source full-color image, the secondary color is one of the primary colors, i.e., R, G or B in an RGB image. Red (R) is used in this embodiment as the secondary color.

Because different color reduction processes are applied to the principal color and secondary color, the full-color image data, separated into pixel units, is output to both the principal color processor 12 and to the secondary color processor 13, where the separate reduction processes are applied. The applied color reduction processes use the respective colors (principal color and secondary color) to binarize each pixel in the full-color image data. In this embodiment of the invention the principal color processor 12 and secondary color processor 13 use dithering for color reduction (binarization). More specifically, a threshold value matrix containing specific threshold values is applied to a matrix of pixel values of the full-color image to binarize the pixels.

At least one reference threshold value matrix of reference threshold values is stored in a reference threshold value matrix memory 14. The principal color processor 12 and secondary color processor 13 read the reference threshold value matrix from the memory 14, compare the threshold values of the reference threshold value matrix (or adjusted versions thereof) with data matrices of the full-color image, and binarize the pixel values accordingly.

The same reference threshold value matrix can be used for both the principal color and the secondary color, or different threshold value matrices can be used for the two colors. For example, to make an image in which the secondary color is brighter than the principal color, or the percentage of the secondary color dots in the image is different from that of the principal color, different threshold value matrices are used for the principal and secondary colors. To simplify the following description, the same reference threshold value matrix is used for both the principal color and secondary color. Operation of the principal color processor 12 and secondary color processor 13 is described further below.

The color reduced (i.e., binarized) principal color print data and secondary color print data generated by the principal color processor 12 and secondary color processor 13 respectively are preferably subjected to one or more correction processes performed by a correction processor 15. Correction processes include using a filter to convert select print data to non-printing data to adjust the color balance to achieve an overall brighter print image, and/or to emphasize the principal color or secondary color. This is further described below.

As noted above, once read from memory, the values in the reference threshold value matrix (or matrices) can be changed to generate new matrices to be used by the principal and secondary color processors 12 and 13 respectively. Such change is affected by a matrix configuration unit 16. A threshold value adjuster 17 of the matrix configuration unit 16 changes the values stored in the reference threshold value matrix to generate one or more new matrices. A request could be asserted from the application program 50, for example, to change the values of the reference threshold value matrix. The value used to change the reference threshold value matrix that is applied to generate the principal color print data in the principal color processor 12 is called the "first adjustment value" herein, and the value used to change the reference threshold value matrix that is applied to generate the secondary color print data in the secondary color processor 13 is called the "second adjustment value" herein. In addition, the threshold value matrix resulting from the first adjustment value being applied to the reference threshold value matrix is called the "first threshold value matrix," and the threshold value matrix resulting from the second adjustment value being applied to the reference threshold value matrix is called the "second threshold value matrix." The first threshold value matrix is used to binarize the principal color data, and the second threshold value matrix is used to binarize the secondary color data.

Figure 2:
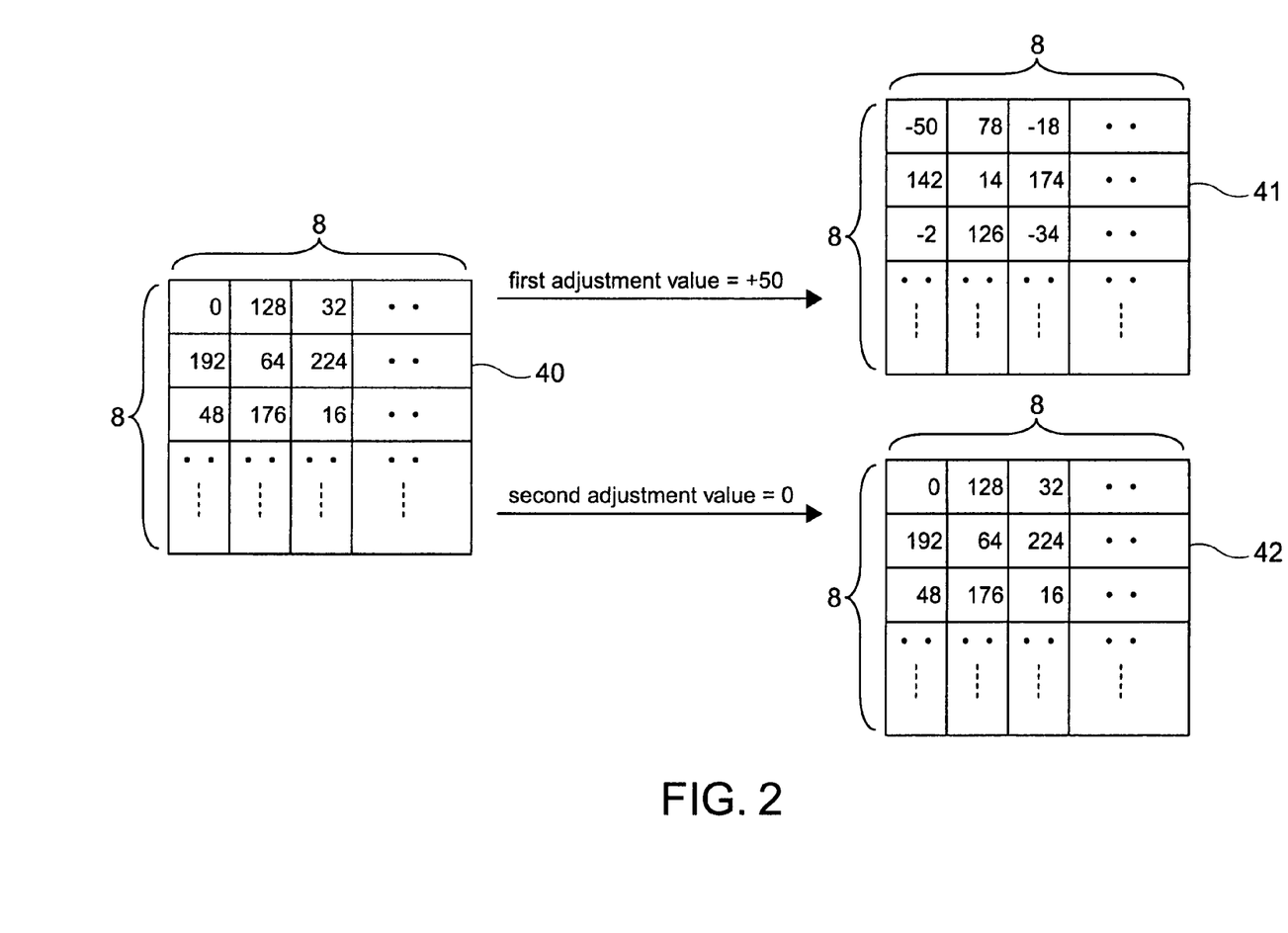
FIG. 2 shows examples of the reference threshold value matrix, the first threshold value matrix, and the second threshold value matrix.

FIG. 2 shows examples of the reference threshold value matrix 40, first threshold value matrix 41, and second threshold value matrix 42. The reference threshold value matrix 40 is an 8×8 matrix of threshold values that are used, in either unadjusted or adjusted form, to binarize full-color image data by dithering. The first threshold value matrix 41 is the result of an adjustment having been made to reference threshold value matrix 40. In this example, a first adjustment value of (+50) is subtracted from the each value in the reference threshold value matrix 40 to generate the first threshold value matrix 41. The second threshold value matrix 42 is the result of having applied a second adjustment value (in this case 0, meaning that no change is made) to the reference threshold value matrix 40. The first and second adjustment values could also be set to negative (−) values.

The first threshold value matrix 41 is calculated using the equation: (corresponding value of first threshold value matrix)=(value of the reference threshold value matrix)−(first adjustment value). Thus, because the first adjustment value is +50 in the example shown in FIG. 2, each threshold value in the first threshold value matrix 41 is 50 less than its corresponding threshold value in the reference threshold value matrix 40.

Likewise, the second threshold value matrix 42 is calculated using the equation: (value of second threshold value matrix)=(value of the reference threshold value matrix)−(second adjustment value). The second adjustment value is thus subtracted from each threshold value in the reference threshold value matrix to calculate the second threshold value matrix. Because the second adjustment value is 0 in the example shown in FIG. 2, the values of the second threshold value matrix are the same as their corresponding counterparts in the reference threshold value matrix.

Principal Color and Secondary Color Binarization

Figure 3:
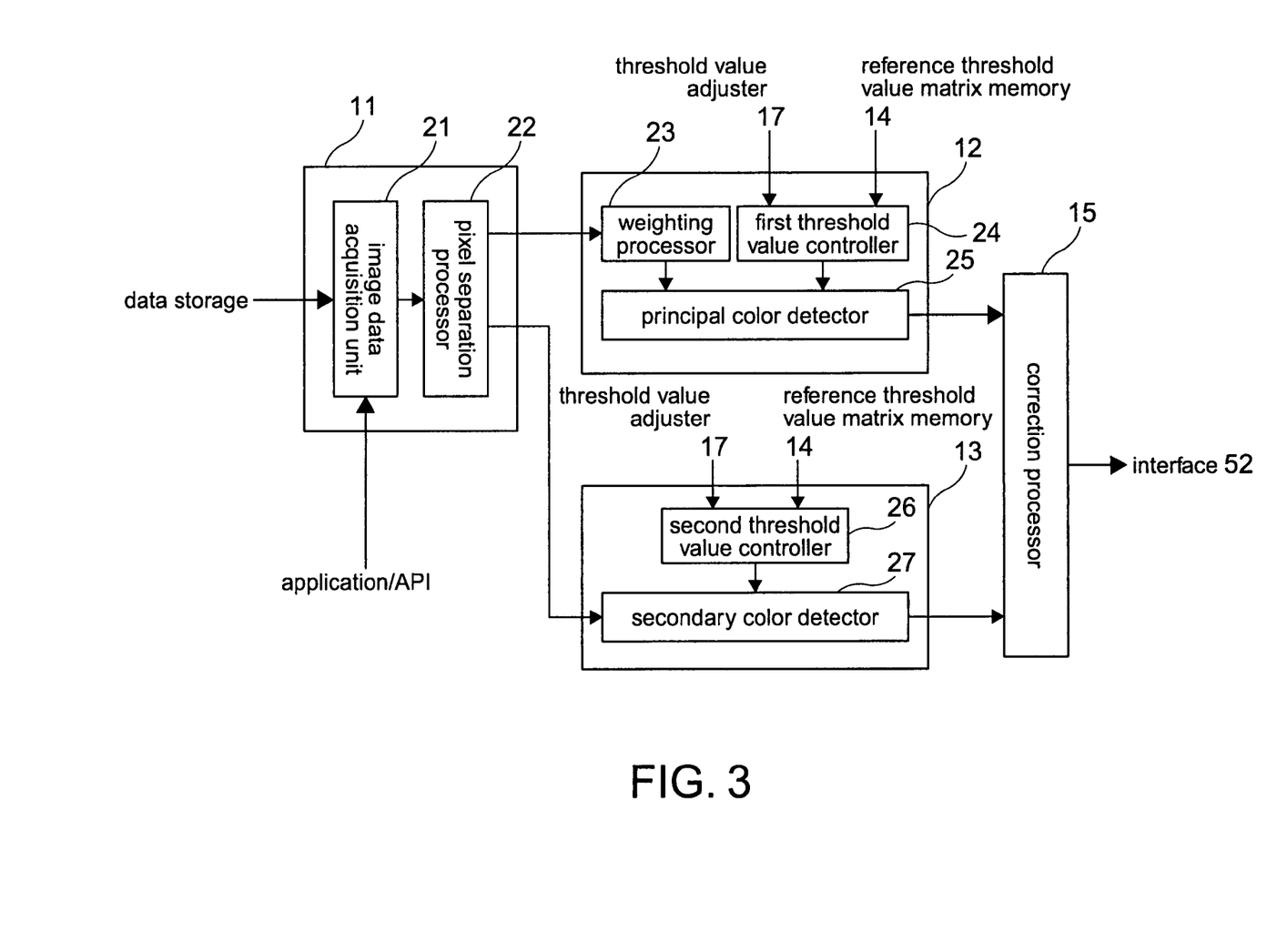
FIG. 3 is a functional block diagram of the image data processor, principal color processor, and secondary color processor according to an embodiment of the invention.

The image data processor 11, principal color processor 12 and secondary color processor 13 are described in further detail with reference to FIG. 3, which is a functional block diagram of these components according to a preferred embodiment of the invention.

When the image data processor 11 receives a color reduction process command from the application program, an image data acquisition unit 21 reads the image file specified by the application program and thus acquires full-color image data. This full-color image data is then deconstructed (i.e., divided) by a pixel separation processor 22 to individual pixel data.

Principal Color Binarization

The image data, separated into pixel units by the pixel separation processor 22, is then output to the principal color processor 12 and secondary color processor 13. A weighting processor 23 of the principal color processor 12 multiplies the R, G and B values for each pixel by corresponding specific weighting coefficients, adds the resulting products together, and thus calculates a weighted value MD for each pixel. The weighted value MD for each pixel can thus be obtained from the following equation, for example.

$$MD=(R\ value*0.299)+(G\ value*0.578)+(B\ value*0.144)$$

A first threshold value controller 24 reads the reference threshold value matrix 40 and first adjustment value from the reference threshold value matrix memory 14 and threshold value adjuster 17 respectively, and generates the first threshold value matrix as shown in FIG. 2.

The weighted pixel values calculated by the weighting processor 23 and the first threshold value matrix generated by the first threshold value controller 24 are both output to the principal color detector 25.

Principal color print data is binarized by comparing each value in a matrix of the weighted pixel values to the corresponding values in the first threshold value matrix. Because the first threshold value matrix 41 is an 8×8 matrix, the matrix of weighted pixel values is also in the form of an 8×8 matrix. All of the weighted pixel values are compared by, for example, sequentially scanning and comparing the values.

If the weighted pixel value is less than the corresponding value in the first threshold value matrix, the principal color detector 25 sets the print data for that dot (pixel) to 1 (print); the print data is set to 0 (non-printing) if the weighted pixel value is greater. If the weighted pixel value is equal to the corresponding threshold value in the first threshold value matrix, the dot (pixel) could be set to print or not print, depending on how this condition is predefined. The principal color detector 25 thus binarizes each dot (pixel) as either a 0 or 1. The binary data is then output to the correction processor 15.

Secondary Color Binarization

After the pixel separation processor 22 separates the full-color image data into individual R, G and B pixel data, the color data of the color components that are not used as the secondary color is used to binarize the secondary color. For example, if red (R) is used as the secondary color, then the green (G) and blue (B) color data is used for binarization. The second threshold value matrix 42, generated by a second threshold value controller 26 using the reference threshold value matrix 40 and the second adjustment value, is used to binarize the secondary color.

If the secondary color is red (R), a secondary color detector 27 compares the respective G and B color values output from the pixel separation processor 22 with the corresponding threshold values in the second threshold value matrix 42. The secondary color detector 27 sets the secondary color (red) value to 1 (print) only if both G and B color data values for that pixel are less than (or, less than or equal to) the corresponding threshold value in the second threshold value matrix 42, and sets the secondary color value to 0 if at least one of the G or B color values is greater. The secondary color detector 27 thus binarizes the secondary color at each dot (pixel) as either a 0 or 1. This binary data is then output to the correction processor 15.

Correction Process

Figure 4:
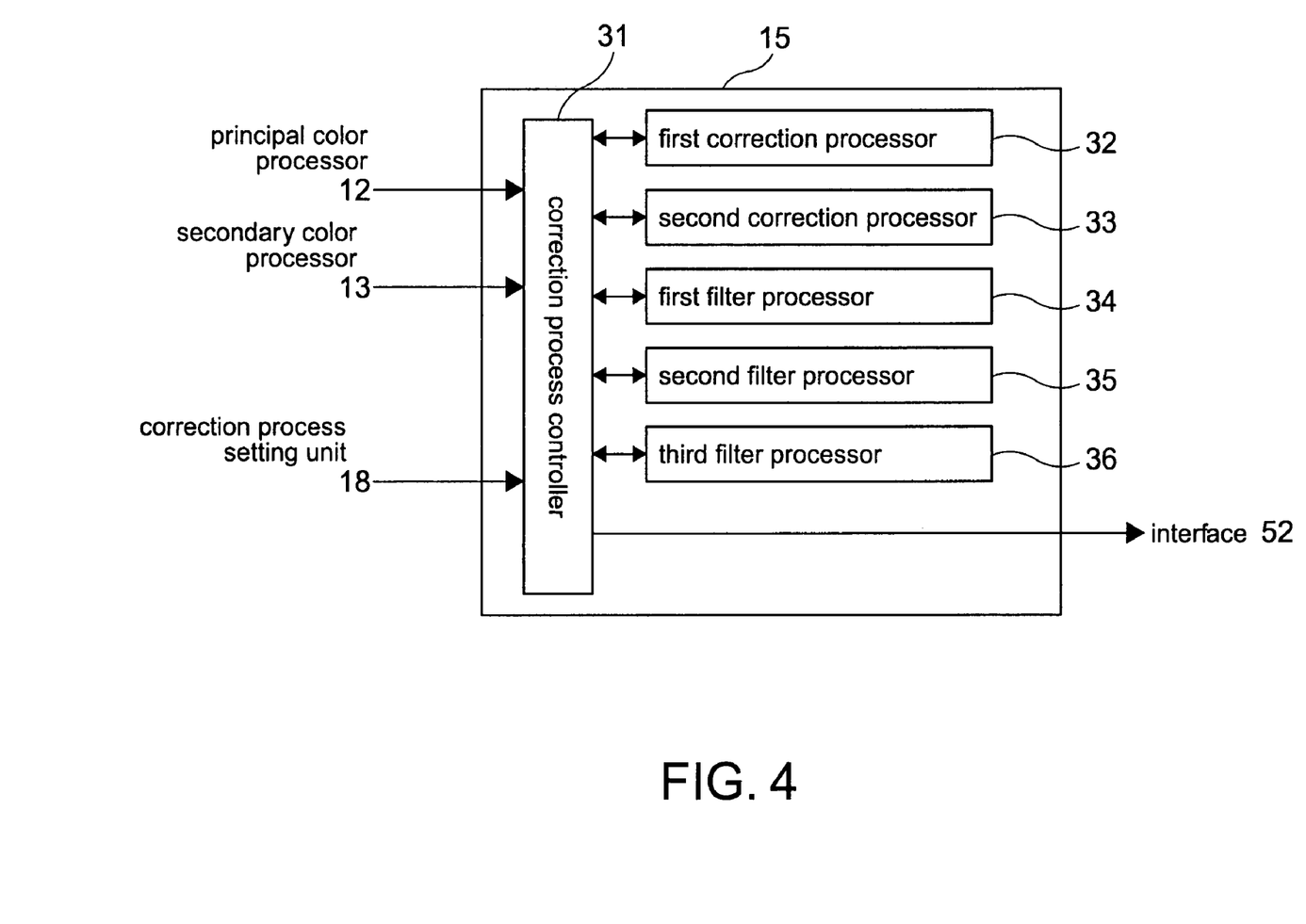
FIG. 4 is a functional block diagram of a correction processor according to an embodiment of the present invention.

The correction process is described next below in connection with FIG. 4, which is a functional block diagram of a correction processor 15 according to a first embodiment of the present invention. This correction processor 15 includes a correction process controller 31 for controlling the overall correction process, first and second correction processors 32 and 33, and first, second and third filter processors 34, 35 and 36.

The binary principal and secondary color data output from the principal and secondary color processors 12 and 13 respectively, and correction process selection information output from a correction process setting unit 18 of the matrix configuration unit 16 are input to the correction process controller 31. The correction process and what filtering to apply are set in the correction process setting unit 18, which outputs the settings to the correction process controller 31. If neither the correction process nor the filtering process is specified, the binary principal and secondary color data are output directly as the print data, and passed through the interface 52 to the printer 60.

If any one of the RGB colors is particularly vivid in the original but is printed black or in a comparably dark color, the overall print image will become dark. Therefore, to prevent this, if any one of the R, G or B color data values in the full-color image data is greater than or equal to a specified threshold value, the first correction processor 32 corrects that dot (pixel) to not print the principal color even if principal color print data for that dot (pixel) is a 1. The threshold value of this first correction process can be set as desired, but the threshold values of the first threshold value matrix for the principal color are preferably used.

If the color value for the R, G, or B color selected as the secondary color is less than a specified threshold value, the second correction processor 33 corrects that dot (pixel) to not print. If the secondary color is red, for example, and the R value of a particular dot (pixel) is less than a specific threshold value, that dot (pixel) is set to not print red. This correction prevents the secondary color from being overemphasized during printing.

These two correction processes can run simultaneously, or the correction could be applied in conjunction with the filtering correction described below (enabling specific correction to be applied only in conjunction with a specific filtering process).

The first filter processor 34 filters the binarized principal and secondary color print data in the print data matrix by column unit, that is, by setting each principal color dot (pixel) in the first column, for example, to "non-printing," then setting each secondary color dot (pixel) in the second column to "non-printing," and alternately repeating this operation throughout the print data matrix.

The second filter processor 35 applies a dot level filter, alternately setting the principal color print data and secondary color print data to "non-printing" in the odd vertical data columns, and alternately setting the secondary color print data and principal color print data to "non-printing" in the even vertical data columns. The principal color print data and secondary color print data are thus alternately set to non-printing in a checkerboard pattern. This filtering process enables color reduction throughout the print image while producing a brighter image.

The third filter processor 36 filters the binarized principal color and secondary color data to find those dots that are set to print (i.e., designated as a 1) both the principal color and secondary color at the same dot (pixel) position, and gives priority to printing the principal color.

Note that a configuration in which the correction process of the second correction processor 33 is enabled and applied only when filtering by this third filter processor 36 is applied is also possible.

Other Embodiments

The invention is described above as generating print data from RGB color data, but the color reduction processor 10 can also be used to process color data in other domains, such CMY. In this case the principal color is set to black or other specific dark color, and the secondary color is set to C, M, or Y. Additionally, the image data processor 11 could include a converter for converting the acquired image data from one color space domain to another, e.g., RGB data to CMY data or vice versa. Methods of converting data from one of these domains to the other are well known in the art; further description is therefore omitted here.

Description of the Color Reduction Process

Figure 5:
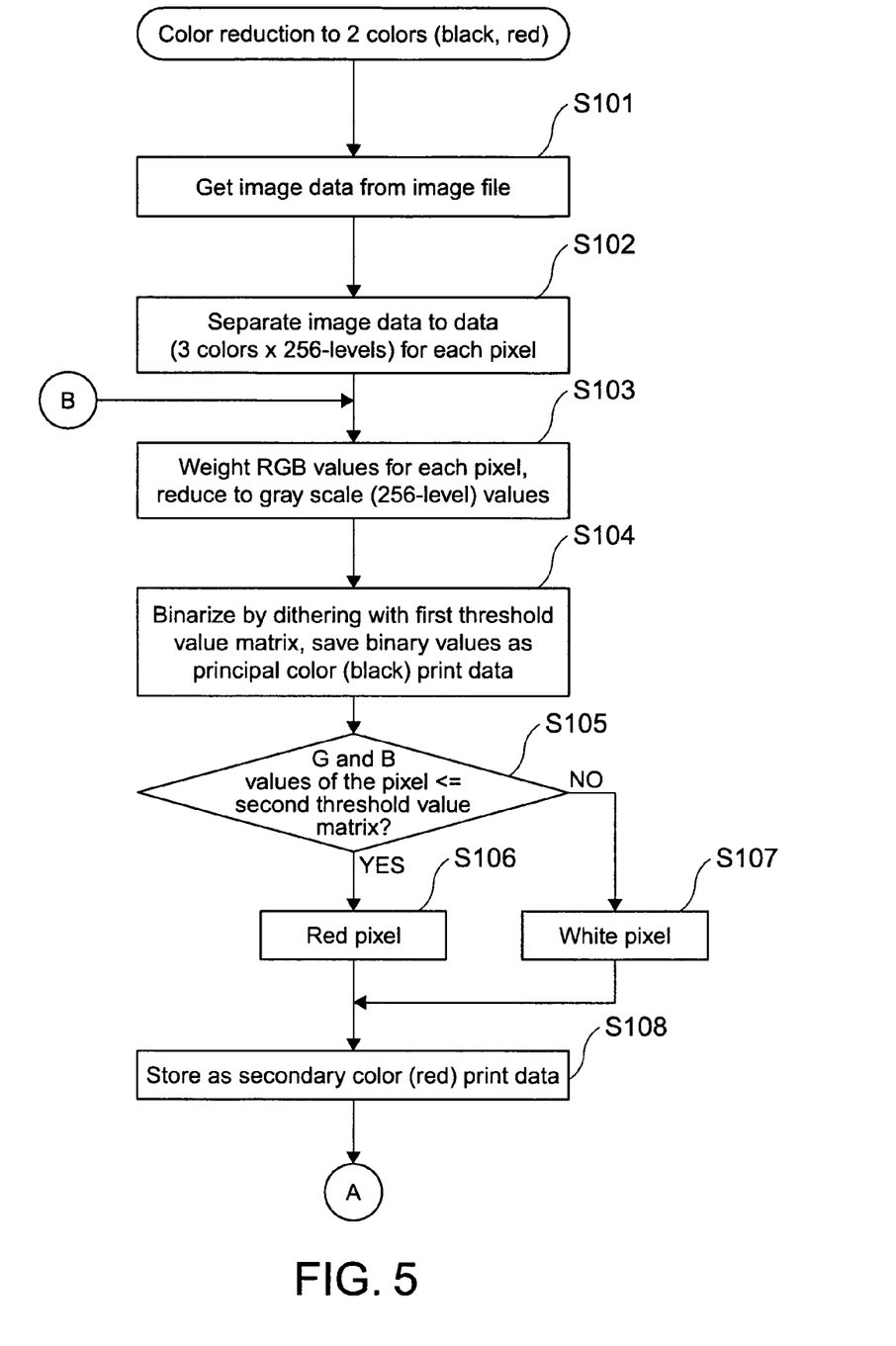
FIGS. 5, 6 and 7 are flow charts showing the color reduction process according to embodiments of the present invention.

The color reduction process of the present invention is described next with reference to the flow charts thereof shown in FIGS. 5, 6 and 7. It is assumed below that the principal color is black and the secondary color is red. This color reduction process is also described using the RGB color system, but as noted above the color reduction process could be executed on CMY color data, which may require first converting RGB data to CMY data. In that case the secondary color is any one of the CMY colors, and the RGB values in the flow chart can be read as CMY.

The image data acquisition unit 21 of the image data processor 11 first acquires full-color image data from the image file specified by the application program 50 (S101). The image data is then separated into the pixel data (S102). Each pixel of the image data at this time is expressed as a combination of R, G and B values, each of which is one of 256 levels. The value of each component (R, G and B) of each pixel is then weighted, and each pixel is reduced to one of 256 gray scale levels (equivalent to the above-described weighted data) (S103). This gray scale data is then dithered using the first threshold value matrix to generate binary data, and saved as the principal color print data (S104).

The secondary color data is binarized next. First, the G and B color values of each pixel's RGB image data are compared with the threshold values in the second threshold value matrix (S105). If, for a particular pixel, both the G and B color values are less than or equal to the corresponding threshold value in the second threshold value matrix (S105 returns yes), that dot (pixel) is set to 1 (to print) (S106), but if at least one of the G or B color value for that pixel is greater than the corresponding threshold value in the second threshold value matrix (S105 returns no), that dot (pixel) is set to 0 (white, i.e., non-printing) (S107). This binarized secondary color print data is stored (S108).

Figure 6:
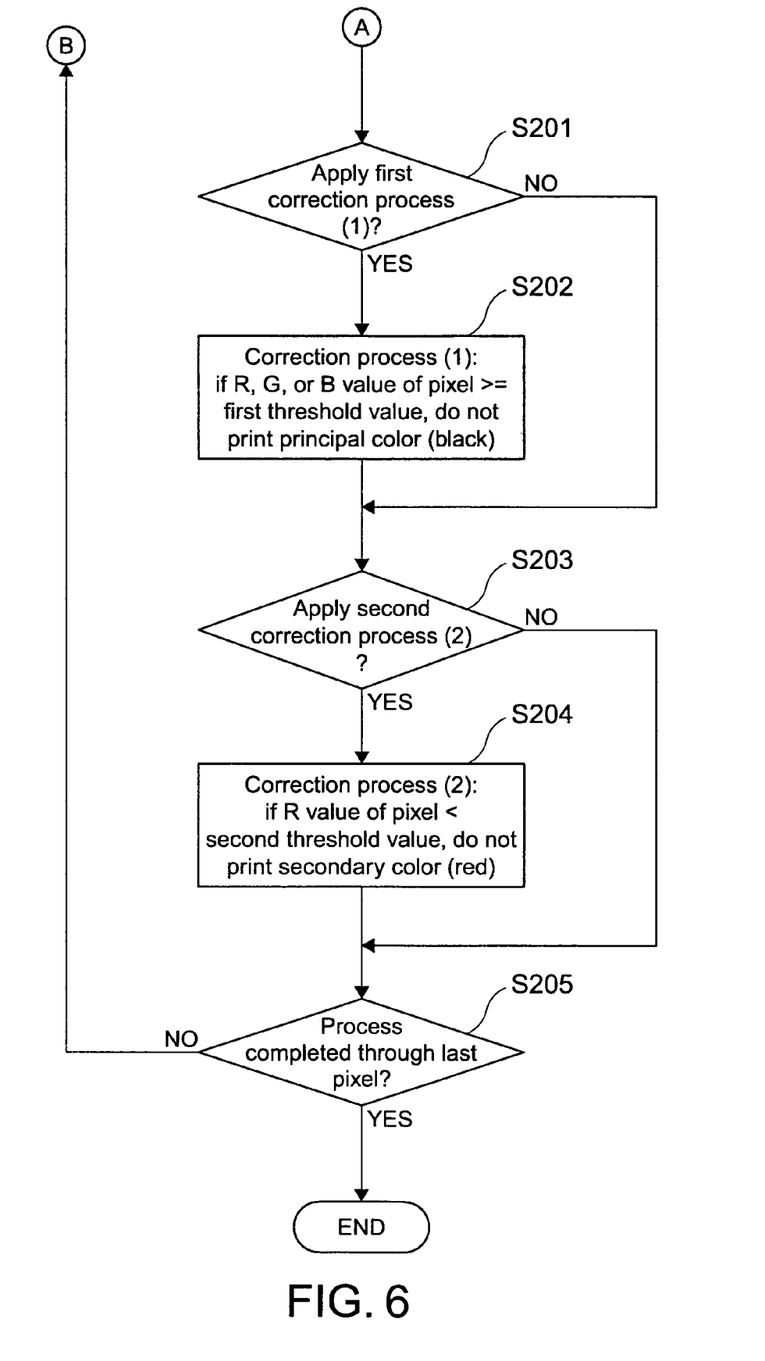

Referring next to FIG. 6, whether correction process (1) was selected is then determined (S201). If correction process (1) was selected (S201 returns yes), the correction process described with reference to the first correction processor 32 above is applied (S202). If correction process (1) is not selected (S201 returns no), correction process (1) (S202) is skipped.

Whether correction process (2) was selected is then determined (S203). If correction process (2) was selected (S203 returns yes), the correction process described with reference to the second correction processor 33 above is applied (S204). If correction process (2) is not selected (S203 returns no), correction process (2) (S204) is skipped.

Whether the last pixel has been processed or not is then determined (S205). If the last pixel has not been processed (S205 returns no), operation returns to step 103 in FIG. 5, and the same process (S103 to S205) is applied until all pixels have been processed. When all pixels have been processed (S205 returns yes), the process ends.

Color Reduction Process with Filtering

The color reduction process when filtering is included is described next with reference to FIG. 7. Correction process (1) is the same as shown in FIG. 6. If the first correction process (1) is not selected or the first correction process (1) has ended (S301, S302), whether a filtering process is to be applied is then determined (S303). If a filtering process is required (S303 returns yes), the specified filtering process is run (S304). If a filtering process is not required (S303 returns no), whether correction process (2) is selected is determined (S305). If correction process (2) was selected (S305 returns yes), the second correction process (2) is run (S306). When correction process (2) ends, or if the second correction process (2) was not run (S305 returns no), whether the last pixel has been processed is determined (S307). Again, the processing continues (repeats) until all pixels have been processed.

Figure 7:
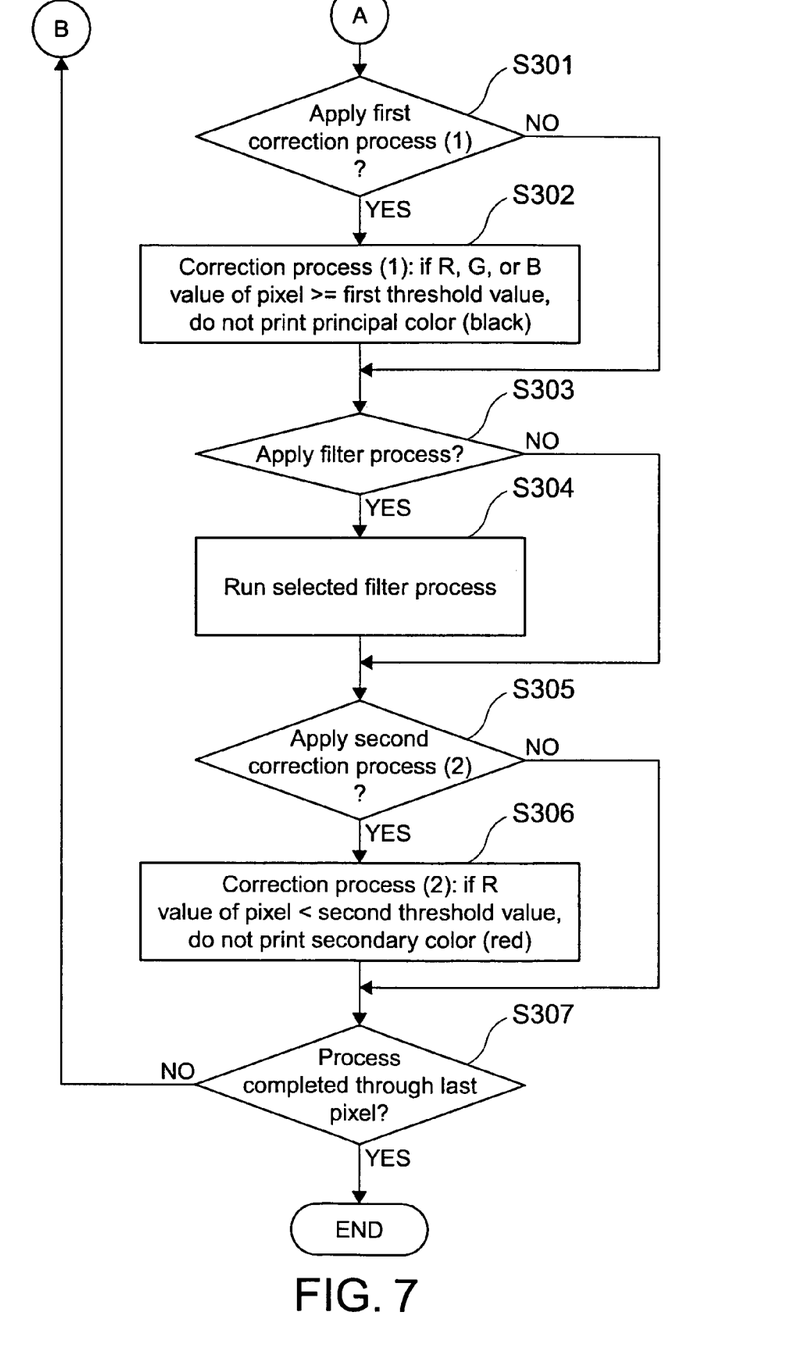

The filtering process is applied before the second correction process (2) in the example shown in FIG. 7, but the filtering process could be applied after the second correction process (2). The process could also be controlled so that the second correction process (2) is executed only if a specific filtering process is applied.

Effect of the Invention

As described above, the present invention binarizes a principal color and secondary color by separate threshold value matrices, which can be independently adjusted. The density of the principal color and secondary color can thus be easily and separately adjusted and controlled.

Furthermore, by setting the principal color and secondary color print dots to non-printing according to a specific pattern, or providing a selectable filter and/or correction scheme for correcting dot (pixel) values according to a specific reference value, the print image can be easily adjusted in various ways, including making the image lighter overall or changing the ratio of principal and secondary colors in the print image.

While the invention has been described in conjunction with various embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A color reduction processing device for converting full-color image data containing pixels, each defined by a combination of three color components, to principal color print data of which black or another specified low-brightness color is the principal color, and to secondary color print data of which a selected one of the three color components is the secondary color, the device comprising:

a matrix storage unit configured to store a reference threshold value matrix;

a matrix configuration unit configured to set a first adjustment value that is mathematically applied to each threshold value of the reference threshold value matrix to generate a first threshold value matrix, and to set a second adjustment value that is mathematically applied to each threshold value of the reference threshold value matrix to generate a second threshold value matrix;

a principal color data processing unit configured to multiply the values of the color components of each pixel in the full-color image data by respective coefficients and add the resulting products for each pixel to produce a single weighted value for each pixel, and to compare a matrix containing all of the weighted pixel values with the first threshold value matrix to generate the principal color print data in the form of binary data; and a secondary color data processing unit configured to compare the second threshold value matrix with matrices containing color values only for the two color components in the full-color image data not designated as the secondary color respectively to generate the secondary color print data in the form of binary data.

2. A color reduction processing device as described in claim 1, wherein the principal color data processing unit and the secondary color processing unit are configured to generate the binarized principal and secondary color print data respectively by dithering using the first threshold value matrix and second threshold value matrix respectively.

3. A color reduction processing device as described in claim 1, wherein the three color components are red (R), green (G) and blue (B) and the principal color data processing unit is configured to calculate the weighted pixel value for each pixel in the full-color image data using the equation:

$$\text{weighted pixel value} = R*0.299 + G*0.578 + B*0.144.$$

4. A color reduction processing device as described in claim 1, further comprising a first correction process unit configured to correct principal color print data to non-printing data for any pixel irrespective of the binary output value of the principal color data processing unit for that pixel, if the value of any one of the color components for that pixel in the full-color image data is greater than or equal to the corresponding threshold value in the first threshold value matrix.

5. A color reduction processing device as described in claim 1, further comprising a second correction process unit configured to correct secondary color print data to non-printing data for any pixel irrespective of the binary output value of the secondary color data processing unit for that pixel, if the value of the color component designated as the secondary color for that pixel in the full-color image data is less than the corresponding threshold value in the second threshold value matrix.

6. A color reduction processing device as described in claim 1, further comprising a third correction process unit configured to correct secondary color print data to non-printing for any pixel, if the principal color data processing unit and secondary color data processing unit both set the principal and secondary color print data for that pixel to print.

7. A color reduction processing device as described in claim 1, further comprising a filter processing unit configured to apply to a binarized print data matrix one or both of: a filtering process that sets principal color print data in a first set of alternating columns in the print data matrix to non-printing and sets secondary color print data in a second set of alternating columns in the print data matrix to non-printing, or a filtering process that alternately sets principal color print data and secondary color print data to non-printing in raster scan sequence.

8. A color reduction processing device as described in claim 1, wherein the device is embodied in a printer driver.

9. A color reduction processing device as described in claim 1, wherein the device is embodied in a printer control apparatus.

10. A color reduction method performed by a color reduction processing device for converting full-color image data containing pixels, each defined by a combination of three color components, to principal color print data of which black or another specified low-brightness color is the principal color, and to secondary color print data of which a selected one of the three color components is the secondary color, the method comprising the steps of:

(a) acquiring full-color image data;

(b) generating a first threshold value matrix and a second threshold value matrix by mathematically applying to the threshold values of a reference threshold value matrix a first adjustment value and second adjustment value respectively;

(c) multiplying the values of the color components of each pixel in the full-color image data by a respective coefficients and adding the resulting products for each pixel to produce a single weighted value for each pixel, and comparing a matrix containing all of the weighted pixel values with the first threshold value matrix to generate the principal color print data in the form of binary data; and (d) comparing the second threshold value matrix with matrices containing color values only for the two color components in the full-color image data not designated as the secondary color respectively to generate the secondary color print data in the form of binary data.

11. A color reduction method as described in claim 10, wherein the binarized principal and secondary color print data generated in steps (c) and (d) respectively is generated by dithering that is performed using the first threshold value matrix and second threshold value matrix respectively.

12. A color reduction method as described in claim 10, wherein the three color components are red (R), green (G) and blue (B) and, in step (c), the weighted pixel value for each pixel in the full-color image data using the equation:

$$\text{weighted pixel value} = R*0.299 + G*0.578 + B*0.144.$$

13. A color reduction method as described in claim 10, further comprising the step of correcting principal color print data to non-printing data for any pixel irrespective of the binary output value for that pixel in step (c), if the value of any one of the color components for that pixel in the full-color image data is greater than or equal to the corresponding threshold value in the first threshold value matrix.

14. A color reduction method as described in claim 10, further comprising the step of correcting secondary color print data to non-printing data for any pixel irrespective of the binary output value for that pixel in step (d), if the value of the color component designated as the secondary color for that pixel in the full-color image data is less than the corresponding threshold value in the second threshold value matrix.

15. A color reduction method as described in claim 10, further comprising the step of correcting secondary color print data to non-printing for any pixel, if, in steps (c) and (d), both the principal and secondary color print data for that pixel is set to print.

16. A color reduction method as described in claim 10, further comprising the step of applying to a binarized print data matrix one or both of: a filtering process that sets principal color print data in a first set of alternating columns in the print data matrix to non-printing and sets secondary color print data in a second set of alternating columns in the print data matrix to non-printing, or a filtering process that alternately sets principal color print data and secondary color print data to non-printing in raster scan sequence.

17. A device-readable medium embodying a program of instructions for directing a device to execute a color reduction method, the program of instructions comprising:

(a) instructions for acquiring full-color image data;
(b) instructions for generating a first threshold value matrix and a second threshold value matrix by mathematically applying to the threshold values of a reference threshold value matrix a first adjustment value and second adjustment value respectively;
(c) instructions for multiplying the values of the color components of each pixel in the full-color image data by a respective coefficients and for adding the resulting products for each pixel to produce a single weighted value for each pixel, and instructions for comparing a matrix containing all of the weighted pixel values with the first threshold value matrix to generate the principal color print data in the form of binary data; and
(d) instructions for comparing the second threshold value matrix with matrices containing color values only for the two color components in the full-color image data not designated as the secondary color respectively to generate the secondary color print data in the form of binary data.

18. A device-readable medium as described in claim 17, wherein the comparing instructions in each of (c) and (d) include instructions for dithering using the first threshold value matrix and second threshold value matrix respectively to generate the binarized principal and secondary color print data respectively.

19. A device-readable medium as described in claim 17, wherein the three color components are red (R), green (G) and blue (B) and, in (c), the weighted pixel value for each pixel in the full-color image data using the equation:

$$\text{weighted pixel value} = R*0.299 = G*0.578 + B*0.144.$$

20. A device-readable medium as described in claim 17, further comprising instructions for correcting principal color print data to non-printing data for any pixel irrespective of the binary output value for that pixel in (c), if the value of any one of the color components for that pixel in the full-color image data is greater than or equal to the corresponding threshold value in the first threshold value matrix.

21. A device-readable medium as described in claim 17, further comprising instructions for correcting secondary color print data to non-printing data for any pixel irrespective of the binary output value for that pixel in (d), if the value of the color component designated as the secondary color for that pixel in the full-color image data is less than the corresponding threshold value in the second threshold value matrix.

22. A device-readable medium as described in claim 17, further comprising instructions for correcting secondary color print data to non-printing for any pixel, if, in (c) and (d), both the principal and secondary color print data for that pixel is set to print.

23. A device-readable medium as described in claim 17, further comprising instructions for applying to a binarized print data matrix one or both of: a filtering process that sets principal color print data in a first set of alternating columns in the print data matrix to non-printing and sets secondary color print data in a second set of alternating columns in the print data matrix to non-printing, or a filtering process that alternately sets principal color print data and secondary color print data to non-printing in raster scan sequence.

* * * * *